Figure 1:
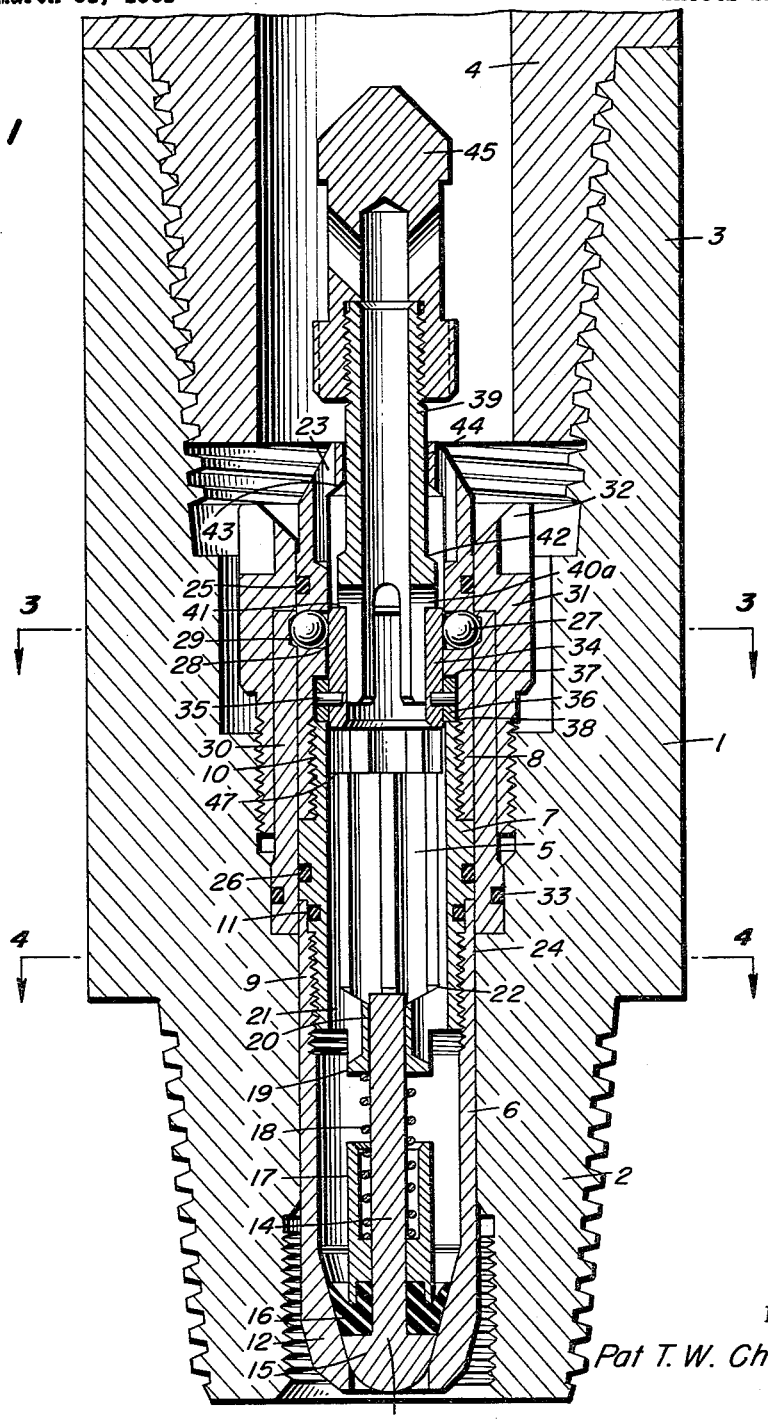

Oct. 15, 1963 P. T. W. CHISHOLM 3,106,932
CHECK VALVE APPARATUS
Filed March 31, 1961 3 Sheets-Sheet 1

INVENTOR
Pat T. W. Chisholm
BY
Burns, Doane, Benedict, Swecker + Mathis
ATTORNEYS Oct. 15, 1963 P. T. W. CHISHOLM 3,106,932
CHECK VALVE APPARATUS
Filed March 31, 1961 3 Sheets-Sheet 3

INVENTOR
Pat T.W. Chisholm

BY
Burns, Doane, Benedict, Swecker & Mathis
ATTORNEYS

United States Patent Office 3,106,932
Patented Oct. 15, 1963

3,106,932
CHECK VALVE APPARATUS
Pat T. W. Chisholm, Duncan, Okla., assignor to Halliburton Company, Duncan, Okla., a corporation of Delaware
Filed Mar. 31, 1961, Ser. No. 99,936
5 Claims. (Cl. 137—68)

This invention relates to a check valve apparatus finding particular utility in testing devices employed in oil wells.

In testing the productivity of oil bearing formations, it is a conventional practice to lower a string of tubing into a well on the end of which is positioned a testing tool. Such a testing tool conventionally includes a valve mechanism for controlling the admission of well bore fluids and a chamber above the valve mechanism for receiving a fluid sample.

In performing productivity tests, formation pressures are occasionally encountered which tend to induce a collapse of pipe walls of the testing string and cause an inflow of fluids into the testing tool of excessive magnitude. To counter such phenomenon, the tubing string may be preloaded with fluid to prevent its collapse and to cushion the flow of fluids from the formation being tested.

In utilizing the pipe loading concept, substantial operational problems are presented. If loading fluid is allowed to enter into the sample receiving chamber of the drill string, flow of formation fluids from lower pressure formations into this chamber is either impeded or altogether prevented. Formation pressure is so masked by the static pressure of the loading fluid column as to make the obtaining of meaningful pressure data impossible. Additionally, test fluids are badly contaminated by the loading fluid.

To effectively segregate the test sample receiving portion of a testing tool and the pipe string loading fluid, a downwardly seating check valve may be interposed between the test chamber and the portion of the test string which is to be fluid loaded. With such an arrangement, the tendency toward collapse of test string pipe walls above the valve is overcome and the loading fluid is prevented from occupying the fluid receiving and pressure recording chamber in the testing tool.

While the inclusion of the check valve in the testing string enables the efficient utilization of pipe string loading fluid, the presence of the valve presents problems when the testing tool becomes stuck in the well bore. When such a contingency develops, it is desirable to obtain access, through the interior of the testing string, to the testing tool or the lowermost portion of the testing string to effect separation of the drill string from the stuck tool. In this connection a conventional practice is to lower an explosive charge through the testing string and detonate the charge in the vicinity of the tool to loosen the coupling means securing it to the testing string.

It may also be desired during a testing operation to circulate fluid downwardly through the testing string. To accomplish this operation, of course, it would be necessary to in some manner enable the flow of fluid downwardly through the check valve.

Recognizing the vital need for a testing string check valve which would provide access to the lowermost portion of the testing string, it is an object of this invention to provide such a check valve assembly which is removable from its operative position.

It is a further object of this invention to provide a removable check valve which may be disengaged and removed from its normal operative position with maximum ease.

An additional object of this invention is to provide such a check valve which, after removal, affords ready access to the lower portion of a drill string.

It is also an object of this invention to provide a removable check valve which is particularly positive and reliable in performing its check valve function and which is provided with means which enable it to be retrieved after being disengaged from its normal mounting.

A final object of this invention is to provide a removable check valve structure which is fabricated to reduce the scouring and abrasion of elements which would be occasioned by a high velocity, through-flow of fluid.

To accomplish the objects of this invention, there is contemplated a check valve apparatus including a generally tubular body provided with coupling means for mounting the body on and in axial alignment with a testing string. In a preferred structure, there are first coupling means at the lower end of the body for engaging a portion of a test string extending below the body and a second coupling means at the upper end of the body for engaged a portion of the test string extending thereabove. A check valve assembly is axially aligned with and telescopingly received within the tubular body. Retaining means are provided for preventing axial movement of the valve assembly relative to the body. Within the valve assembly there are included an upwardly facing valve seat and a valve head above the seat. The valve head is movable axially and downwardly of the assembly to engage the seat in response to fluid pressure above the valve head and movable upwardly and axially of the assembly away from the seat in response to fluid pressure below the valve head. Plunger means are positioned in the valve assembly above the valve head for releasing the retaining means to permit the valve assembly to move axially out of the body. Fluid outlet means may be included in the valve assembly above the valve head which are variable in size in response to fluid pressure in the assembly.

Figure 2:
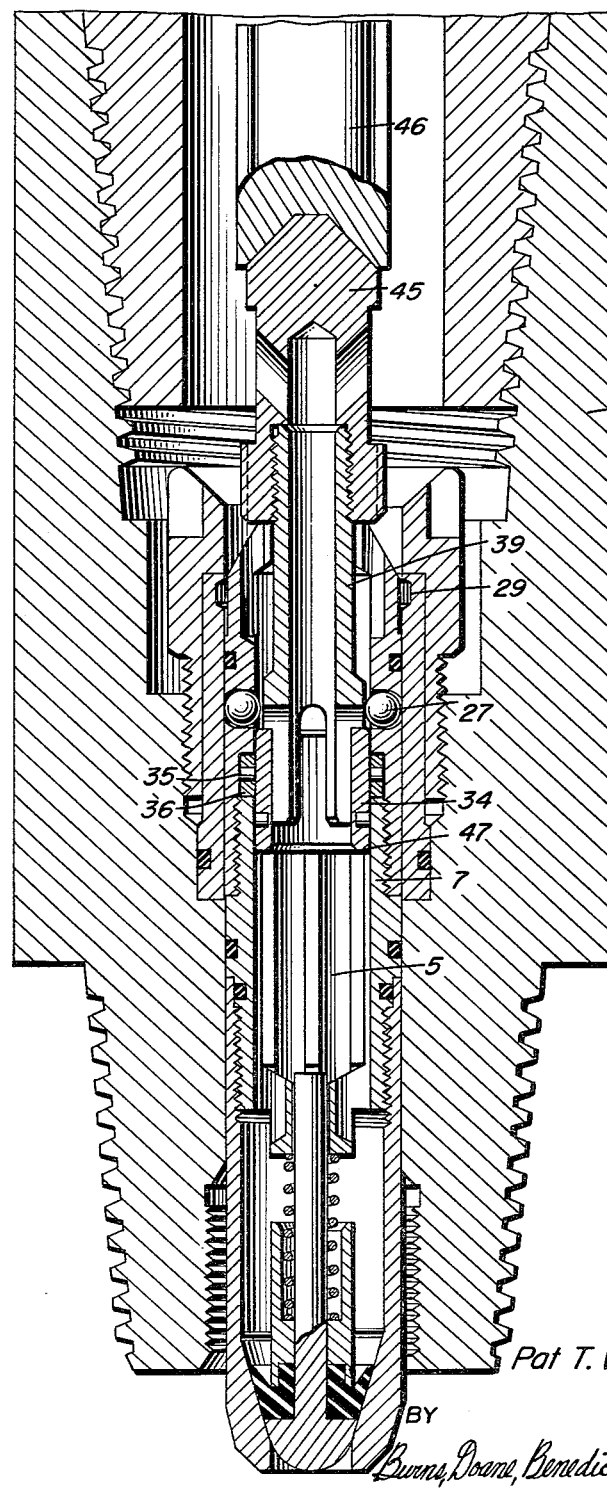
Figure 3:
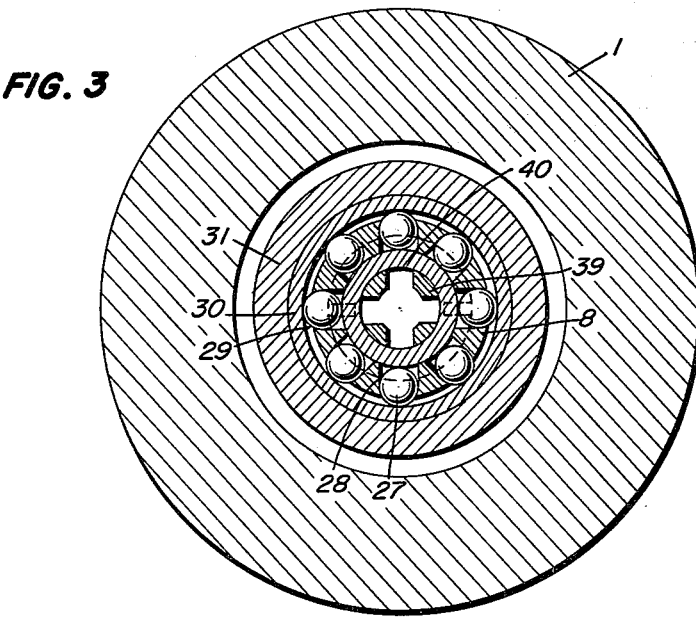
Figure 4:
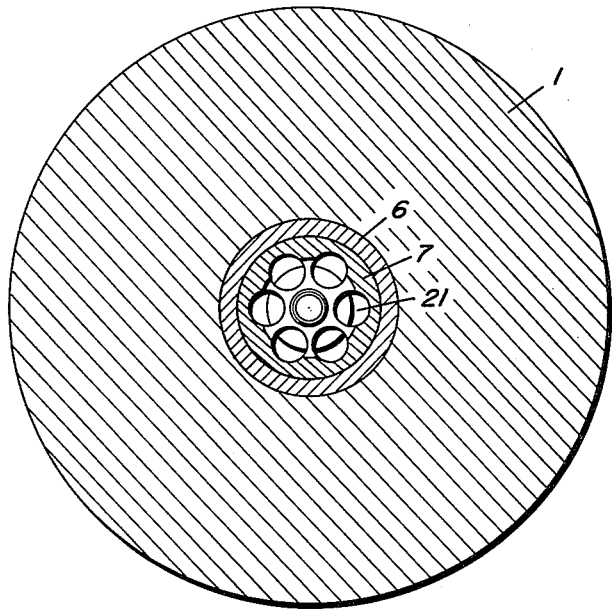
Figure 5:
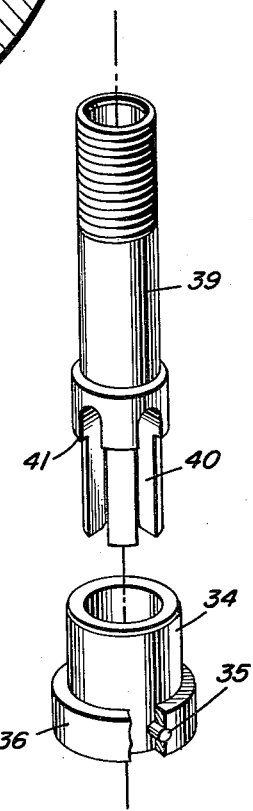

In describing this invention, reference will be made to a preferred embodiment illustrated in the accompanying drawings in which:

FIGURE 1 is a sectional view of the apparatus showing the valve assembly in retained, operative position, FIGURE 2 is a cross sectional view of the apparatus showing the valve assembly after release of the assembly retaining means, FIGURE 3 is a sectional view of FIGURE 1 taken along the line 3—3, FIGURE 4 is a sectional view of FIGURE 1 taken along the line 4—4, and FIGURE 5 is a perspective view of separated plunger means and retaining means components included in the apparatus.

As shown in FIGURE 1, the check valve apparatus includes a body 1 having coupling means for mounting the body in a testing string. This coupling means comprises coupling 2 for securing the lowermost end of body 1 and coupling 3 for securing its uppermost end so as to axially align and integrate the body into the string. Coupling 2 is illustrated as a tapered, threaded pin adapted to engage a conventional tapered, threaded, socket on the upper end of the portion of the test string extending beneath the valve. Coupling 3 is illustrated as a threaded and tapered socket coupling adapted to engage a corresponding pin coupling 4 extending from the upper portion of the test string.

Positioned within valve body 1 is a check valve assembly 5. Assembly 5 includes a generally tubular housing comprising lower tubular member 6, an intermediate tubular member 7 and an upper tubular member 8, all of the same outer diameter. A threaded connection 9 connects the lower and intermediate tubular members 6 and 7 while a threaded connection 10 connects the intermediate and upper members 7 and 8. To insure a sealing interconnection between these components, gaskets may be employed such as O-ring 11 disposed between the engaged portions of tubular members 6 and 7.

The check valve structure of the assembly includes a seat 12 fabricated as an in integral portion of the lower terminus of tubular member 6. Positioned above seat 12 is a valve head generally designated 13. Valve head 13 includes a guiding stem 14 and an enlarged end portion 15 supporting a cup seal 16. The cup seal 16 is secured by a retainer 17. The entire valve head 13 is biased downwardly into engagement with seat 12 by means of coil spring 18 interposed between the retainer 17 and an abutment 19 integrally formed on and disposed centrally of intermediate tubular member 7. Extending axially of check valve assembly 5 and through abutment 19 is an elongate opening 20 adapted to slidably receive and guide stem 14 of valve head 13. Through this guiding arrangement, positive axial alignment of valve head 13 and seat 12 is insured.

Extending through the valve head assembly is a longitudinal fluid passage defined by the hollow interiors of tubular members 6, 7 and 8. In this connection, it is to be noted that the passage through intermediate tubular member 8 includes channels 21 between web sections 22 extending between the abutment 19 and the tubular wall of intermediate member 7. As shown in FIGURE 1 and the cross sectional view of FIGURE 4, this longitudinal passage arrangement through intermediate tubular member 7 is provided by forming a plurality of longitudinally extending channels 21 extending the length of tubular member 7 and by then removing the central portion of this tubular member above abutment 19. This passage structure, however, is merely the result of a convenient mode of fabrication and other arrangements may obviously be employed in its stead to provide fluid passage means through tubular member 7.

To provide a fluid outlet at the upper end of the assembly, longitudinally extending channels 23 are fabricated in upper tubular member 8.

Check valve assembly 5, as heretofore described, is thus characterized by a generally tubular outer configuration of uniform diameter. The assembly is received for axially slidable movement within bore 24 of body 1. To provide sealing engagement between body 1 and the assembly 5, gaskets in the form of O-rings 25 and 26 are provided.

To prevent axial movement between check valve assembly 5 and body 1, releasable abutment means are positioned between these components. As illustrated in FIGURES 1 and 3, these abutment means comprise ball members 27 mounted in ball retaining recesses 28 in the wall of upper tubular member 8. Ball members 27 are movable in recesses 28 transversely of the wall of tubular member 8 and are of greater diameter than this wall. Thus ball members 8 may be disposed to project outwardly from the wall of tubular member 8 into an annular recess 29 in body 1. As illustrated, annular recess 29 is fabricated in a bushing 30 which defines the upper portion of body bore 24. To secure bushing 30, a nut 31 is threadably secured to body 1 so as to abuttingly engage the upper end of bushing 30. To facilitate the manipulation of nut 31, tool engageable recesses 32 are formed on its upper exposed end. An O-ring 33 is provided to effect sealing engagement between bushing 30 and body 1.

To hold ball members 27 projecting outwardly from tubular member 8 into annular recess 29, a sleeve 34 is positioned within tubular member 8 to engage ball members 27 to prevent their inward movement. Sleeve 34 is frangibly secured to assembly 5 by means of shear pins 35. As illustrated, shear pins 35 project outwardly from sleeve 34 into a shear pin mounting ring 36 secured between abutment 37 on tubular member 8 and abutment 38 on the upper end of intermediate tubular member 7.

For releasing ball member retaining sleeve 34, a plunger 39 is mounted in the upper portion of assembly 5 above the sleeve. As shown in FIGURES 1 and 5, plunger 39 is axially bored to provide a longitudinal fluid passage and is slotted at its lowermost end to provide a plurality of longitudinally extending, transverse openings 40 affording fluid communication between the central passage of the plunger and its exterior. An upper section of the slotted portion of the plunger 39 is enlarged in diameter to provide an annular abutment 41. With this arrangement, the slotted portion of plunger 39 may be partially inserted into sleeve 34. Abutment 41 engages the top of sleeve 34 to limit this inward movement so as to insure the partial exposure of the upper portions of slots 40 above the sleeve. The slotted portions 40a thus exposed provide an outlet for fluid passing through the assembly.

Plunger 39 is slidably supported on sleeve 34 such that upward fluid force within assembly 5 is effective to raise the plunger 39 and increase the area of the slotted portions 40a exposed above the sleeve. In this manner the fluid outlet is increased in size in response to fluid pressure within the assembly. Upward movement of plunger 39 out of assembly 5 is prevented by annular abutment 42 formed on plunger 39 and spaced from annular abutment 43 carried at the upper end of tubular member 8.

Plunger 39 extends freely through an opening 44 in abutment 43. To facilitate the retrieving of the assembly 5, a fishing neck 45 is mounted on the upper end of plunger 39 projecting above assembly 5. As illustrated, fishing neck 45 is laterally apertured to provide an outlet for fluid passing through the central passage of plunger 39.

With the apparatus disposed in operative position as shown in FIGURE 1, check valve assembly 5 is securely mounted within body 1. The guided and spring biased valve head 13 insures effective check valve operation of the device.

In the event that it becomes necessary to obtain access to the portion of the drill string beneath the check valve, check valve assembly 5 may be dislodged from body 1 with minimum manipulation. This is accomplished by merely delivering an impact blow to fishing neck 45 as, for example, by dropping a bar 46 into the well. When bar 46 engages fishing neck 45 as shown in FIGURE 2, a shearing force is transmitted through plunger 39 to ball retaining sleeve 34. This shearing force fractures shear pins 35 to allow sleeve 34 to move downwardly out of ball member supporting position into an enlarged upper portion of the interior tubular member 7. Movement of sleeve 34 into member 7 is limited by abutment 47 at the base of this enlarged portion. With ball members 27 no longer retained against inward movement, they will then move inwardly of assembly 5 and out of recess 29 to free assembly 5 for telescoping, i.e., axially slidable, movement through body 1. The assembly 5, thus freed, will drop into the lower portion of the testing string and provide a substantial opening through body 1.

It is to be noted that with the assembly 5 removed from body 1, an unobstructed bore through body 1 is left which particularly facilitates the lowering by a wire line of tools or other apparatus to the lower portion of the testing string. Its substantial size is such as to enable effective fluid circulation through the test string.

In the event that it should be desired to retrieve check valve assembly 5 rather than allow it to drop into the lower portion of the tool, an overshot fishing device may be lowered on a cable to engage fishing neck 45. After an impact blow has been imparted to fishing neck 45 by means of a weight dropped on the wire line, the line may be raised to recover the removable valve assembly 5. With an upward force exerted on the wire line, the plunger 39 is pulled upward until abutment 42 engages 43 to support and carry the assembly.

While in its operative position, excessive fluid flow may occur through the check valve assembly. Under such flow conditions, rigid structural members would normally undergo scouring and fluid abrasion. However, with plunger 39 being movable upward in response to fluid pressure to increase the size of the exposed slot portions, the size of the outlets 40a are increased as flow increases so as to effectively offset scouring tendencies and materially reduce the abrading of the plunger and other internal components of assembly 5.

While the apparatus of this invention has been described with respect to a preferred embodiment, it will be readily obvious to those skilled in the art that structural modifications may be effected which are well within the purview of the invention. For example the plunger provided with a fishing neck may be arranged to free the valve assembly in response to an upward pull as well as a downward impact and coupling means other than those disclosed may be employed to mount the apparatus in a test string. It is equally obvious that check valve assembly restraining means differing somewhat in structure from that disclosed may be utilized. Bearing in mind such obvious modifications, the scope of this invention is deemed to be defined in the appended claims.

I claim:

1. A check valve for use in oil well testing strings or the like comprising:
   a generally tubular body,
   first coupling means at one end of said body for engaging pipe means extending below said body,
   second coupling means at the other end of said body for engaging pipe means extending above said body,
   a check valve assembly axially aligned with and telescopingly received within said body, said check valve assembly being removable from either end of said body,
   retaining means operably connecting said body and valve assembly for preventing axial movement of said valve assembly within said body,
   a sleeve within said check valve assembly adapted to hold said retaining means in operable position,
   a valve seat in said assembly facing upwardly,
   a valve head in said assembly above said valve seat and movable downwardly and axially of said assembly to engage said seat in response to fluid pressure above said valve head and movable upwardly and axially of said assembly away from said seat in response to fluid pressure below said valve head,
   axially movable plunger means in said valve assembly above said valve head for moving said sleeve to release said retaining means and permit said valve assembly to move axially out of either end of said body,
   and fluid outlet means in said valve assembly above said valve head, said fluid outlet means having upwardly movable portions defined by portions of said axially movable plunger means, which movable portions provide passage means extending laterally of the longitudinal axis of said plunger means, said passage means being at least partially closed by said sleeve when said plunger means is in its lowermost position, and said passage means being progressively opened as said plunger means moves upwardly so as to cause said fluid outlet means to be variable in size in response to fluid pressure within said assembly sufficient to cause axially upward movement of said plunger means.

2. An apparatus as defined in claim 1 wherein:
   said check valve assembly includes a generally tubular wall portion;
   said retaining means includes first abutment means carried by said tubular wall portion and movable laterally therethrough to project on either side thereof;
   said sleeve is positioned within said tubular wall portion adjacent said first abutment means and engaging said first abutment means to effect their projection externally of said wall portion;
   said apparatus includes frangible means between said wall portion and said sleeve for holding said sleeve in first abutment means engaging position;
   said body includes internal recess means for receiving said first abutment means projecting from said tubular wall portion of said check valve assembly to lock said assembly against axial movement;
   and said plunger means includes second abutment means above said sleeve whereby downward movement of said plunger means causes said second abutment means to exert downward force on said sleeve to shear said frangible means between said tubular wall portion and said sleeve and cause said sleeve to move downwardly out of said first abutment means engaging position to allow said first abutment means to move inwardly of said tubular wall portion and out of said body recess means to free said check valve assembly for axial movement through said body.

3. An apparatus as defined in claim 2 wherein:
   said plunger means, movable upward in said assembly in response to fluid pressure therewithin, includes an axially extending passage in fluid communication with the interior of said check valve assembly and a longitudinally slotted end portion extending into said sleeve;
   said slotted end portion providing said laterally extending passage means between said axially extending passage and the exterior of said plunger means; and
   said second abutment means on said plunger means positions said plunger means relative to said sleeve to cause said slotted end portion to project partially thereabove, said slotted end portion thus exposed above said sleeve providing said fluid outlet means, whereby upward movement of said plunger means is effective to raise said slotted end portion to increase the exposed portion thereof projecting above said sleeve to increase the size of said outlet means.

4. An apparatus as defined in claim 3 wherein said plunger means includes coupling means at its upper end engageable by a valve assembly retrieving tool.

5. An apparatus as defined in claim 4 wherein said valve head includes an axially extending guiding stem and spring means biasing said valve head into engagement with said valve seat.

References Cited in the file of this patent

UNITED STATES PATENTS

| | | |
|---|---|---|
| 2,737,245 | Knox | Mar. 6, 1956 |
| 2,839,144 | Ault | June 17, 1958 |
| 2,937,658 | Stewart | May 24, 1960 |
| 2,994,280 | Daffin | Aug. 1, 1961 |
| 3,042,116 | Sharp | July 3, 1962 |